Sept. 8, 1936.  H. J. PERETZMAN  2,053,918
PLUG AND TAP
Original Filed March 30, 1934
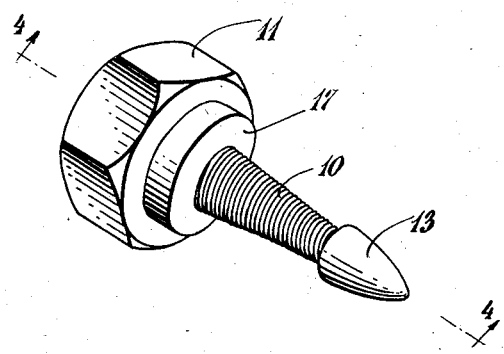
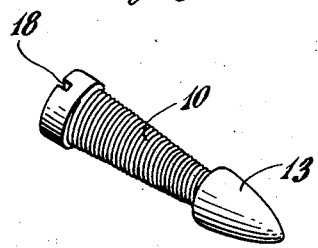
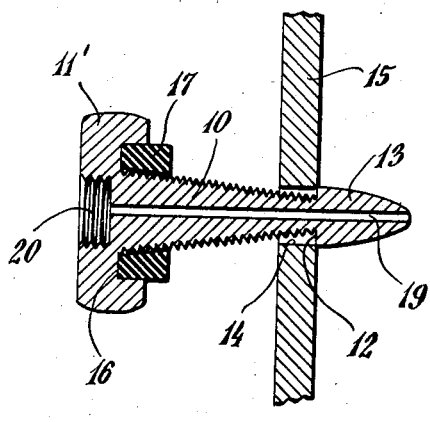
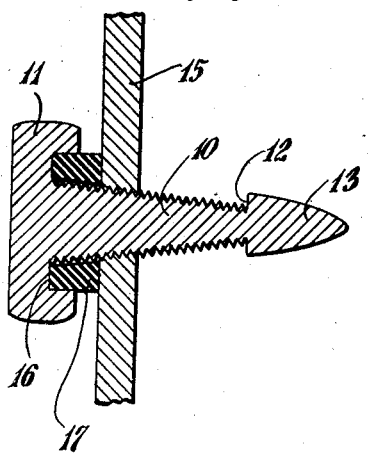
INVENTOR
Hyman J. Peretzman
BY
ATTORNEY Patented Sept. 8, 1936

2,053,918

UNITED STATES PATENT OFFICE 2,053,918

PLUG AND TAP

Hyman J. Peretzman, Brooklyn, N. Y.

Application March 30, 1934, Serial No. 718,223
Renewed February 10, 1936

3 Claims. (Cl. 138—98)

The present invention relates to plugs and particularly to the type known as repair plugs or boiler plugs; same being a device for closing holes occuring in boilers or pipes as a result of corrosive action or rust. When such plugs are provided with a bore they serve as taps.

I have used in my trade as a plumber, the various types of plugs on the market, but have experienced much difficulty and inconvenience in the installation thereof, and in the fact that too often, they fail in their required function. I have found that either I need tools which could enlarge the hole for the insertion of the plug, or else, with some types, a hole is made which remains unplugged, but which relies on a rubber element which soon becomes defective and instead of the initial small leak, am confronted with a large leaking orifice.

To avoid these difficulties and disadvantages and to accomplish a secure and non-leaking plugging device, which when constructed with but slight modifications may be adapted to a wide range of uses, I have originated the invention which I now set forth.

In the accompanying drawing, forming part of this application, similar characters of reference indicate corresponding parts in all the views.

Fig. 1 shows a perspective view of a plug embodying my present invention.

Fig. 2 is a similar view of a modified form thereof.

Fig. 3 is a sectional view showing an embodiment of my invention as applied to a tap construction.

Fig. 4 is a section taken at line 4—4 in Fig. 1, showing a hole in a boiler plate fully plugged.

In the drawing, the numeral 10 designates a finely threaded tapered shank of circular cross section having a bolt head 11 at its larger end, while its smaller end terminates in the base 12 of an integral tapered or bullet-shaped preliminary tool portion 13; the area and form of said base 12, being more than the smallest cross sectional area of the shank portion 10, so that somewhere along the shank's length, its threads can be engaged in a hole 14 through which the preliminary tool portion 13 has been knocked through, in the boiler plate or pipe wall 15, to close the hole.

Within an annular channel 16 on the underside of the head 11, and projecting therefrom for a short length about the shank portion 10, is a rubber tubular member 17, which serves to safeguard the joint. This is desirable but not mandatory in the practice of my invention.

In practice, I find that the holes to be plugged are quite small and are encircled by rust crusted metal which is comparatively yielding. This hole had to be enlarged, first to remove the rotten metal and second to provide a hole suitable for the admission of the plug, to accomplish which I had to use several successive sized punches or else by brace and bit.

In the use of my present invention, I place the pointed end of the preliminary tool portion 13 into the hole to be plugged, then I hammer the head until the entire preliminary tool 13 has been knocked through to form a clear hole 14 in the plate or pipe wall 15. Now with a wrench, when using the plug shown in Fig. 1, or with a screw driver in slit 18 when using the plug shown in Fig. 2, I screw the tapered portion 10 into the hole thereby forming a secure joint; the fine threads of the tapered shank biting into the metal of the plate.

Referring to the Fig. 3, and for the moment disregarding the existence of the axial bore 19, there is shown the position of the plug just as the preliminary tool portion 13 has been knocked through the plate to make the hole 14. Now referring to the Fig. 4, we see the plug fully inserted securely plugging the hole.

I find it often extremely desirable to tap the hole for the installation of a pet cock, valve or nipple, as the particular condition may call for. Therefore I provide the plugs with an axial bore 19, counterbored in the head 11 at 20, which latter I provide with an internal thread to receive a pet cock or nipple (not shown) which use will be readily understandable by men in my trade, or else said opening 20 may itself be plugged with a standard fitting.

I have thus provided an extremely useful article of novel and improved construction, which I find to be practical, convenient and efficient, which is cheap to manufacture and requires no special skill to install.

This invention is capable of numerous forms and various applications without departing from the essential features herein disclosed. It is therefore intended and desired that the embodiments shown herein be deemed illustrative and not restrictive, and that the patent shall cover whatever features of patentable novelty exist in the invention disclosed; reference being had to the following claims rather than to the specific description herein to indicate the scope of the invention.

I claim:—

1. An article of the character described, having a pair of uni-directional tapered portions, of which one serves to enlarge the hole to be closed for the free admission therein of part of the other tapered portion, which latter, intermediate its ends, is adapted to close the hole; the larger end of the first tapered portion being larger in size than the smaller end of the other tapered portion.

2. An article of the character described, having a pair of uni-directional tapered portions, of which one serves to enlarge the hole to be closed for the free admission therein of part of the other tapered portion, which latter is threaded and is adapted, intermediate its ends, to close the hole; the larger end of the first tapered portion being larger in size than the smaller end of the other tapered portion.

3. An article as set forth in claim 1, provided with an axial bore therethrough for communication with the interior of the structure in which the hole is closed.

HYMAN J. PERETZMAN.